Figure 1:
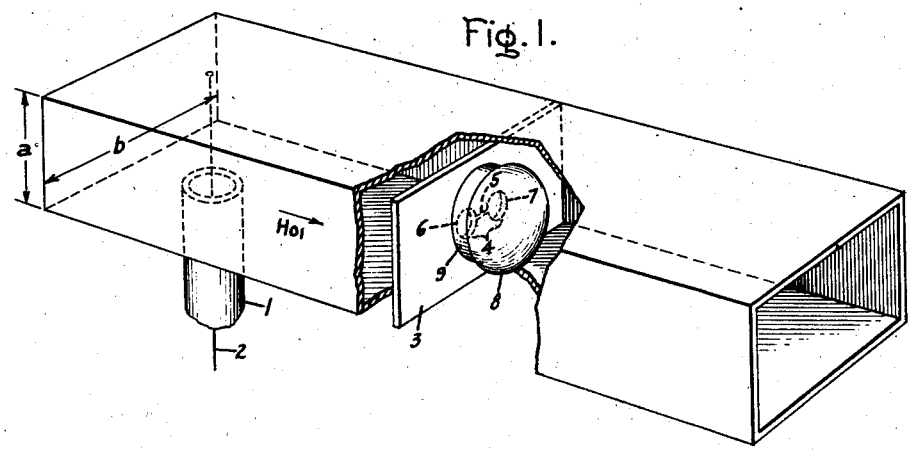

Sept. 3, 1946.   M. D. FISKE   2,407,069
DIELECTRIC WAVE GUIDE SYSTEM
Filed Sept. 15, 1942   2 Sheets-Sheet 1

Inventor:
Milan D. Fiske,
by Harry E. Dunham
His Attorney.

Sept. 3, 1946. M. D. FISKE 2,407,069
DIELECTRIC WAVE GUIDE SYSTEM
Filed Sept. 15, 1942 2 Sheets-Sheet 2
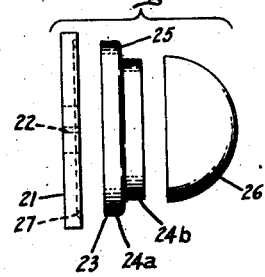
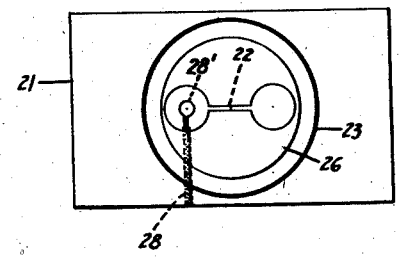
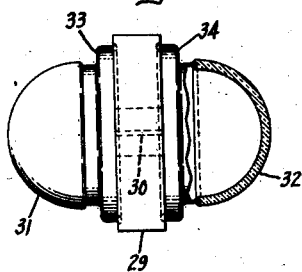
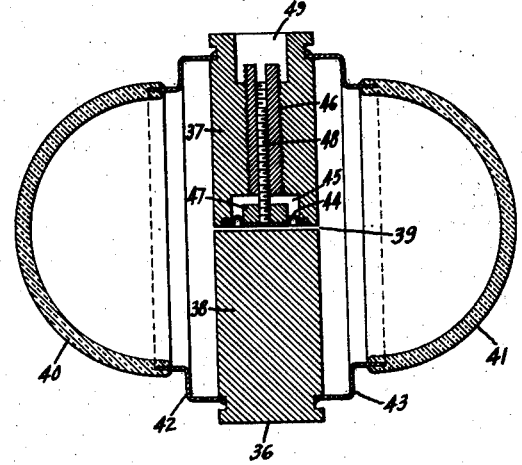
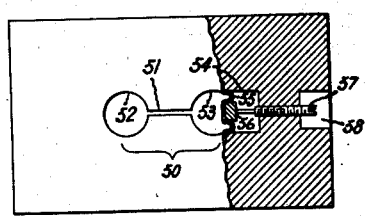
Inventor:
Milan D. Fiske,
by Harry E. Dunham
His Attorney.

Patented Sept. 3, 1946

2,407,069

UNITED STATES PATENT OFFICE 2,407,069

DIELECTRIC WAVE GUIDE SYSTEM

Milan D. Fiske, Schenectady, N. Y., assignor to General Electric Company, a corporation of New York Application September 15, 1942, Serial No. 458,423

14 Claims. (Cl. 178—44)

My invention relates to dielectric wave guides of the hollow-pipe type for transmitting electromagnetic waves of ultra high frequency, and more particularly to structures associated therewith for selectively controlling the propagation of electromagnetic waves through the guides.

It is now quite generally appreciated that electromagnetic waves may be propagated through the interior of a hollow pipe type guide which may be constructed of a conductive material and which contains a dielectric medium such as air or a gas through which the energy of the waves is transmitted. Of course, the frequency of the exciting electromagnetic waves must be greater than the critical minimum frequency established by the dimensions, principally the transverse dimensions of the guide.

There may be placed within the interior of a dielectric guide a metallic wall having an aperture which is tuned to the frequency of the exciting waves to effect a concentration of the potential due to the waves within or across a substantially small dimension of the aperture. As the intensity or the magnitude of the exciting electromagnetic waves is increased, the magnitude of the potential difference appearing between opposing surfaces of the aperture is also increased, and when the magnitude of this potential difference increases to a predetermined value established by the configuration of the aperture and the dielectric strength of the medium surrounding the aperture, an electric discharge is established across the aperture thereby materially changing the propagation characteristics of the guide.

One way in which a structure of this nature may be employed is in connection with a system which is subjected to electromagnetic waves of considerable range of intensity and utilizing the characteristics of the aperture to effect transmission or attenuation of the waves within the guide.

It is an object of my invention to provide a new and improved dielectric wave guide of the hollow-pipe type and associated structure whereby the transmission of electromagnetic waves or the attenuation thereof within the guide may be selectively controlled.

It is another object of my invention to provide a new and improved structure, such as a resonant slot or aperture associated with the dielectric guide tuned to the frequency of the exciting waves, and which is designed to prevent the propagation of waves therethrough in the event the intensity thereof exceeds a predetermined value.

It is a further object of my invention to provide a new and improved resonant structure associated with a dielectric wave guide which is highly responsive to the magnitude of the exciting electromagnetic waves.

It is a further object of my invention to provide a new and improved resonant aperture within a metallic wall enclosed within or associated with a wave guide of the dielectric type, and which is enclosed within an atmosphere, such as a gas, at low pressure.

It is a still further object of my invention to provide new and improved arrangements for controlling or adjusting the natural resonance frequency of an aperture mounted within a hollow-pipe wave guide of the dielectric type.

It is a still further object of my invention to provide a new and improved assembly for maintaining a resonant aperture in a dielectric wave guide in an atmosphere of desired pressure, and which is proportioned so that the reflection of the electromagnetic waves is reduced to a minimum throughout that range of intensities within which it is desired to propagate the waves.

Briefly stated, in the illustrated embodiments of my invention I provide a metallic wall having an enclosed resonant aperture, such as a resonant slot, tuned substantially to the frequency of the exciting electromagnetic waves and which is designed to effect a breakdown of the surrounding atmosphere in the event the intensity of the electromagnetic waves attains or exceeds a predetermined value. The presence of the electric discharge across the slot varies the effective dielectric constant of the dielectric medium through which the electromagnetic waves are propagated, thereby changing the wave guide from a propagator to an attenuator of the electromagnetic waves.

More specifically, I provide structures for enclosing the resonant aperture or structures or for sealing a portion of the dielectric wave guide which is defined by the wall which comprises the aperture. The sealing structure may comprise a vitreous dielectric material, such as glass, which may have various configurations. The dielectric material may be in the form of a plate, or may be of bulbous or hemispherical form. In any case, the dielectric material is positioned and proportioned so that the reflection therefrom is substantially equal and opposite to the reflection produced by the presence of the wall and the resonant aperture. Stated in other words, the assembly including the wall and the sealing dielectric is substantially reflectionless.

In accordance with a still further teaching of my invention, I provide a structure for housing a tuned aperture in a dielectric wave guide and which is sealed to maintain the aperture in an atmosphere of low pressure, and which is also provided with externally accessible adjusting means to control or tune the aperture.

Figure 2:
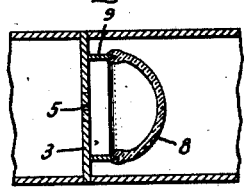
Figure 3:
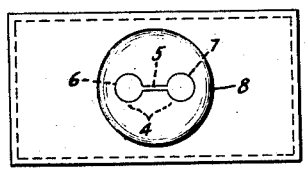
Figure 4:
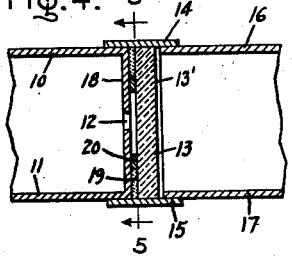
Figure 5:
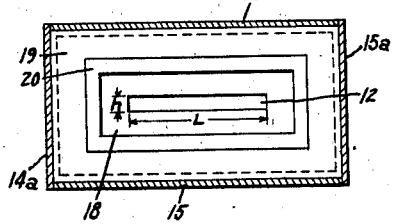

For a better understanding of my invention, reference may be had to the following description taken in connection with the accompanying drawings, and its scope will be pointed out in the appended claims. Fig. 1 diagrammatically illustrates one way in which my invention may be incorporated in a hollow-pipe dielectric wave guide, and Figs. 2 and 3 are views of the sealing structure for the resonant aperture or slot. Figs. 4 and 5 diagrammatically illustrate another modification of my invention wherein the sealing structure constitutes a dielectric window of plane construction. Fig. 6 represents a further modification of my invention wherein a bulbous vitreous dielectric window may be attached or sealed to the frame including the resonant aperture by means of a sealing ring having a temperature coefficient of expansion substantially equal to that of the dielectric material employed. Fig. 7 represents an assembly of the elements shown in Fig. 6, and Fig. 8 is a still further modification wherein the enclosing compartment for the resonant aperture comprises two bulbous type vitreous windows mounted on opposite sides of the metallic wall. Fig. 9 diagrammatically illustrates a still further feature of my invention wherein the resonant element is provided with means for controlling its effective dimensions, the means being externally controllable. Fig. 10 diagrammatically illustrates another manner in which externally accessible means may be employed for controlling the natural resonance frequency of the slot and wherein the adjustable means is positioned so that it is not subjected to the electric discharge when the magnitude of the waves exceeds a predetermined value.

Prior to a detailed description of the various embodiments of my invention, it is believed that it will be helpful to describe generally the type of system to which my invention is applicable. It is now understood that ultra high frequency electromagnetic waves may be propagated dielectrically through hollow-type guides where the frequency of the exciting electromagnetic waves is greater than a critical minimum frequency which, in turn, is determined principally by the transverse dimensions of the guide. The guide is preferably constructed of a conductive material such as copper or brass.

Many types of high frequency electromagnetic waves may be transmitted dielectrically through hollow-pipe type guides. These waves have been generally indicated heretofore as being of the E and H types. Subscripts, as indicated, $E_{n,m}$ and $H_{n,m}$, have been assigned to these waves in order to indicate the nature of the waves, where $n$ represents the order of the wave and $m$ represents the mode of propagation. The order of the wave is determined by the manner in which the field intensity varies circumferentially around the axis of the guide, whereas the mode is determined by the manner of its variation with radial distance from the axis of the guide. The E type waves have both a longitudinal and a transverse component of electric field but only a transverse component of magnetic field, whereas the H type waves have both a longitudinal and a transverse component of magnetic field but only a transverse component of electric field. Although my invention is applicable to systems for transmitting a great variety of waves, in describing my invention hereinafter reference will be made particularly to the $H_{01}$ type of wave.

Referring now to Fig. 1 of the accompanying drawings, my invention is there illustrated as applied to a system including a hollow-pipe type wave guide of the dielectric type. The dielectric wave guide may be of rectangular cross section formed by conductive material, such as copper or brass, having a height $a$ and a base dimension $b$. Electromagnetic waves are established within the guide by suitable exciting electrodes which may have various configurations, depending upon the nature of the excitation required or desired. One form which the input electrodes or exciting means may assume is that of a concentric line including a tubular conductor 1 and a conductor 2, the former of which is conductively connected to the bottom of the wave guide and the latter of which may be conductively connected to the top. There is positioned within the wave guide a metal wall 3, preferably constructed of copper or brass, and which is provided with an aperture 4 having an appreciable dimension transverse to the direction of propagation of electromagnetic waves through the guide. Where the wave guide is excited by electromagnetic waves of the $H_{01}$ type, for example, the slot affords a principal dimension transverse to the electric component of the electromagnetic field and effects a concentration of the potential due to the wave across the upper and lower edges of the slot. This accentuation or concentration of the potential due to the wave is effected by virtue of the fact that the slot is tuned to the frequency of the exciting waves. If desired, the resonant aperture may be of the configuration illustrated wherein an elongated slit 5 is provided with enlarged openings, such as circular openings 6 and 7, at each end thereof, and the complete opening or aperture is tuned to be resonant at the frequency of the exciting waves.

The wall 3 and the associated dielectric window constitute one end of the sealed chamber or section of the dielectric wave guide, the other longitudinal end of such section being provided by the end wall beyond the concentric electrode means 1 and 2. Of course it is to be understood that the concentric line may be sealed in any conventional way so that the region between the wall 3 and the end wall may be maintained at a desired low pressure.

Where the principal transverse dimension of the aperture is perpendicular to the electric component of the electromagnetic field, the dimensions of a rectangular aperture may be calculated with reference to the dimensions $a$ and $b$ of the wave-guide. Generally speaking, as the effective dimension of the aperture transverse to the electric component of the field is increased, the frequency to which the aperture is resonant is decreased. Furthermore, as the effective height of the aperture approaches zero, the effective length of the aperture approaches the limit $$\frac{\lambda}{2}$$

where $\lambda$ is the wave length of the exciting electromagnetic waves.

Where it is desired to seal a portion of a dielectric wave guide or to maintain the aperture within an atmosphere at the proper pressure in order to effect a selective response in accordance with the magnitude of the electromagnetic waves being transmitted, I provide a sealing structure for the aperture which performs the sealing function without sacrificing the wave transmitting characteristics of the guide. For example, in Fig. 1 I provide a bulbous type dielectric window 8 for the resonant aperture and which is designed to neutralize substantially any reflection or discontinuity in the wave propagating characteristics of the guide incident to the wall 3 and the aperture 4. Stated in other words, the bulbous dielectric window 8 produces an effect which is substantially equal and opposite to that of the wall 3 and the aperture so that the amount of energy reflected is minimized.

The manner in which the dielectric window 8 cooperates with the wall 3 and the associated aperture to minimize any discontinuity in impedance of the dielectric guide may be more fully appreciated by reviewing certain fundamental concepts relative to the propagation of an $H_{01}$ type wave in a dielectric guide. The total impedance $Z_0$ of a rectangular wave guide, which may, of course, be characterized as the ratio of the applied voltage V to the current I, may also be defined as follows:

$$Z_0 = \frac{V}{I} = \frac{E_0 \pi c}{2} \lambda_g \frac{a}{b} \quad (1)$$

where $E_0$ is the dielectric constant of air, $\lambda_g$ is the wave-length of the waves within the guide, and $c$ is the velocity of light. If the total guide impedance is constant along the guide, the wave will be propagated with no reflection. To maintain this impedance constant for changes in guide dimensions $a$ and $b$, one must have at any particular wave-length the following relationship for a rectangular guide:

$$\frac{a}{b} \lambda_g = \text{constant} = k \quad (2)$$

where $\lambda_g$, the phase-wave-length of the waves transmitted through the guide, is:

$$\lambda_g = \lambda \left[ 1 - \left( \frac{\lambda}{2b} \right)^2 \right]^{-\frac{1}{2}} \quad (3)$$

and where $\lambda$ is the wave length of the exciting waves in free space and where the electric component of the field is perpendicular to the dimension $b$ of the guide.

Where the transverse wall includes an aperture which is resonant to the frequency of the exciting electromagnetic waves and where the change in the guide dimensions occasioned by such a structure is a small fraction of the wave length of the waves transmitted through the guide, the change in the total impedance offered by the guide is also relatively small.

Therefore, I provide a window 8 which offers an impedance effect substantially equal and opposite to that produced by the resonant aperture, so that a wave propagated through the guide experiences substantially no reflection. The resonant aperture 5—7 is the electrical equivalent of a parallel resonant circuit and the window 8 appears as a reactance in shunt with this parallel resonant circuit. Whether the reactance is capacitive or inductive in the plane of wall 3 is determined by the spacing of window 8 from wall 3. This spacing and the dimensions of aperture 5—7 may be correlated so that the equivalent electrical circuit of the aperture and window is resonant at the frequency of the wave propagated through the wave guide.

The voltage or potential difference appearing between the upper and lower edges of the aperture is effected by the resonant characteristics of the aperture, and the magnitude of this voltage difference increases as the magnitude of the exciting waves increases. Upon reaching a predetermined value, the dielectric material within the aperture breaks down; that is, the voltage difference is sufficient to cause ionization of the medium which may be air, and an electric discharge takes place across the aperture. Upon occurrence of such an electric discharge, the wave transmitting characteristics of the guide are radically changed, causing rapid attenuation of the electromagnetic waves within the vicinity of the wall 3. Without attempting to enter into any detailed discussion of the reason why the waves are not transmitted beyond the wall 3, suffice it to say that the presence of the charged particles within the vicinity of the resonant aperture, due to the electric discharge, effectively changes the dielectric constant of the medium through which the waves are being propagated, as, for example, air in the present discussion, thereby substantially increasing the critical minimum frequency for the particular guide employed so that the waves are not propagated an appreciable distance beyond the wall 3.

Fig. 2 represents a more detailed cross sectional view of that portion of the wave guide including the wall 3 of the dielectric window 8. The dielectric window 8 may be constructed of a suitable vitreous material, such as a boron-silicate glass, and sealed to the metal wall 3 by means of a cylindrical flange 9. The flange 9 may be constructed of an alloy, such as an iron-nickel-cobalt alloy, to facilitate sealing of the glass to the metal wall.

In Fig. 3, an end view of the bulbous dielectric window and the resonant slot is also illustrated.

Figs. 4 and 5 represent two views of a different form of the dielectric window for sealing a section of a dielectric wave guide. The metallic wall including the resonant aperture or slot may be formed integral with the walls of the dielectric wave guide as shown in Fig. 4 where the walls constitute right-angle extensions of the top 10 and the bottom 11 of a section of a rectangular wave guide. In this modification of my invention, the resonant aperture may be in the nature of a tuned or resonant rectangular slot 12 which is also tuned to the frequency of the exciting means which establishes the electromagnetic waves in the guide and in which the height $h$ and the length $L$ thereof bear a definite relationship with respect to the excitation frequency and the transverse dimensions of the guide, particularly the base dimension $b$. It is to be understood that various dimensions of the resonant slot may be employed; that is, the dimensions of the slot may be varied and still maintain its resonance with respect to the exciting frequency.

I provide a sealing structure for a dielectric wave guide which not only affords mechanical strength where it is desired to seal a section of a dielectric wave guide, but is also designed and arranged so that the assembly including the slot, the metallic wall, and the dielectric window, is substantially reflectionless. Furthermore, the dielectric window construction which I provide per at a partial vacuum or at low pressure.

More particularly, as a means for sealing a section of a wave guide, I provide a dielectric window 13, preferably constructed of a vitreous material such as glass and which may be partially supported in position by means of adjoining metallic straps 14 and 15 which establish a suitable conductive path between the top 10 and bottom 11 of one section of a wave guide and a top 16 and bottom 17 of another section of a dielectric wave guide. It is to be understood that similar straps 14a and 15a shown in Fig. 5 are also placed along the sides of the guide to afford similar bridging means. In this manner, a continuous conductive path is provided between the two sections of the guide. If it is not desired to form the wall or diaphragm 18, which includes the resonant slot 12, integral with the top and bottom members 10 and 11, the diaphragm may be soldered or welded to these members.

The window 13 is designed and positioned relative to the wall 18 so that the reflection from the slot 12 cancels the reflection from the dielectric, or vice versa, depending upon the direction of wave propagation through the guide. The window 13 may be cemented to the diaphragm by using a vacuum cement 19 so that one of the sections or regions of the wave guide may be maintained at a different pressure from an adjoining region.

I have found that the length L of the slot 12 required to make the window 13 reflectionless depends very critically upon the proximity or spacing of the dielectric material used in the window. To establish this distance and to allow space for the cement 19, a thin metal gasket or spacer 20 is inserted around the slot 12. This gasket may be formed as an integral part of the wall or diaphragm 18 and positioned as close to the slot as desired. Residual reflection from the window 13 after construction may be canceled or neutralized by cementing to the outside surface of the dielectric window 13 a diaphragm 13' of properly chosen characteristics.

I have found that a window constructed in accordance with the principles of my invention described herein, particularly that type of window construction represented in Figs. 4 and 5, causes very little reflection of the electromagnetic waves. For example, a window constructed in accordance with my invention reflects substantially only 0.3% of the energy incident upon it.

Figs. 6 and 7 diagrammatically illustrate a still further modification of the window construction for a dielectric wave guide wherein a metallic wall member 21 positioned in a dielectric wave guide and preferably constructed of a metal, such as brass or copper, is provided with a resonant aperture 22 of the type having an elongated slit with circular openings at either end. In order to establish a seal of suitable mechanical rigidity and one which is substantially reflectionless, by maintaining the dielectric element of the window precisely positioned relative to the wall and the slot, I provide an arrangement wherein the dielectric window is sealed to the wall by means of a supporting frame or ring 23, preferably constructed of a metal such as an iron-nickel-cobalt alloy, thereby facilitating the sealing of a vitreous or glass dielectric window 24 which is of bulbous of hemispherical configuration. The metallic ring 23 is preferably constructed of a thin sheet and may be formed by a suitable stamping operation so that it is provided with two sections 24a and 24b of unequal diameter joined by a substantially transverse section 25 so that a certain degree of resilience is provided to compensate for strains incident to pressure and temperature variations. In this manner, variations in pressure do not change the position of the glass window, and consequently do not appreciably affect the net reflection from the window. Furthermore, the glass window 26 is constructed of a suitable glass, such as boron-silicate, having a temperature coefficient of expansion substantially equal to that of the metal constituting the ring 23. Wall 21 is provided with an annular groove 27 in which the section 24a of ring 23 is seated. Ring 23 may be welded or soldered to wall 21.

In the production of this type of window, the ring 23 may be sealed to the wall 21, and the glass window 26 may be sealed to section 24b of the ring by placing the window 26 upon the section 24b and subjecting the ring 23 to a heating agency such as a high frequency field, causing the glass to seal around the outer edge of section 24b, the diameter and thickness of the glass being such that an appropriate amount of material is provided for making a seal of desired strength.

As an agency for controlling the effective dimensions of the resonant slot or aperture, I provide externally accessible means for varying the natural resonance frequency of the slot, and which may comprise a screw 28 which extends into the body of the wall 21 and into the aperture, and as illustrated may extend into one of the circular openings at the ends of the elongated slit 22 thereof. It will be appreciated that as the position of the screw is changed, the effective dimensions of the aperture are also changed, thereby adjusting or controlling the frequency at which the aperture is resonant.

If desired, the screw 28 may be provided with an extension 28' of substantially paddle shape which may extend into one of the circular openings of the resonant slot, and the position of which determines or controls the natural resonance frequency of the slot.

Where it is desired to maintain the resonant aperture in a suitable atmosphere and at the proper pressure, thus maintaining a high degree of sensitivity of the aperture to the intensity of the electromagnetic waves being transmitted through the guide, the aperture may be completely enclosed in such an atmosphere. For example, two arrangements such as shown in Fig. 6 may be employed, one on each side of the wall 21, in a manner illustrated in Fig. 8 wherein a wall 29, provided with a resonant aperture 30, is sealed by bulbous vitreous windows 31 and 32, which are sealed to the wall 29 by rings 33 and 34 of a construction and material similar to ring 23 discussed in connection with Fig. 6.

The atmosphere employed within the enclosure may be any suitable fluid or gas which will support an electric discharge when the voltage difference between the edges of the slot or aperture attains a predetermined value, and which permits a substantially rapid extinction of the arc when the voltage difference decreases below the critical value. For example, I may employ within the enclosure an atmosphere of hydrogen and water vapor, an atmosphere of nitrogen, or an atmosphere of argon.

It will be understood that in the application of the embodiment of my invention shown in Fig. 8, to a dielectric wave guide, wall member 29 is placed in conductive contact with the metallic or conductive walls of the guide. For example, it may replace the wall 3 and associated assembly shown in Fig. 1.

As stated above, the dimensions of a resonant slot in a system of this nature are fairly critical; that is, variations in the dimensions change the frequency at which the aperture or slot is resonant. In some applications and in the operation of dielectric wave guides, it may be desirable to tune or adjust the frequency at which the aperture is resonant while maintaining the aperture in a region of low pressure or in a region of a desired atmosphere. Consequently, I provide externally accessible means for controlling the effective dimensions of a tuneable aperture mounted in a metallic wall suitable for use in connection with a dielectric wave guide. One form of my invention is illustrated in Fig. 9 wherein a metallic wall 36 is employed and may be constructed in upper and lower sections 37 and 38 to facilitate the construction of the aperture and to permit the placement therein of the adjusting means to be described presently.

The aperture 39 may be of the form illustrated in Fig. 7 comprising a restricted elongated section and having circular openings at each end thereof. Furthermore, the aperture 39 may be maintained at a low pressure, or may be maintained in a suitable atmosphere at the proper pressure by means of a pair of bulbous vitreous windows 40 and 41 which are sealed to and supported by the wall 36 by means of metallic rings 42 and 43 constructed in the manner explained above in connection with the apparatus shown in Fig. 6. The rings 42 and 43 may be seated in annular grooves in the end faces of wall 36.

As a means for tuning the resonant aperture 39, I provide an adjustable member, such as a deformable diaphragm 44, which may constitute one boundary of the resonant aperture and may be welded or soldered to the upper section 37 of wall 36.

The upper section 37 of wall 36 is provided with a recess 45, which may be of rectangular cross section, and is also provided with a communicating circular opening 46 which extends to an outer periphery of the upper section 37. This arrangement permits external adjustment of the position of the diaphragm so that it is not necessary to disturb the seal for the resonant aperture in making an adjustment. I provide a metallic block 47 which is connected to the diaphragm 44 and which is positioned by means of a differential screw arrangement 48 which extends from the block 47 to the recess 49. The block 47 is preferably constructed of a material having a relatively high thermal conductivity and thermal capacity to facilitate the dissipation of the heat incident to the establishment of electric discharges across the boundary of the resonant aperture when the intensity of the electromagnetic waves exceeds the critical value. For example, the block 47 may be constructed of copper. Upon adjustment of the differential screw arrangement 48, the block 47 is raised or lowered, thereby deforming the diaphragm 44 and effectively controlling the dimensions of the resonant aperture. Of course, the diaphragm 44 is sealed to the upper section 37 of wall 36 so that the adjustment may be made without disturbing the condition of the atmosphere within which the resonant aperture is enclosed.

An alternative embodiment of my invention is illustrated in Fig. 10 wherein the adjustable means for controlling the natural resonance frequency of an aperture or slot 50 is positioned in the slot so as not to be subjected to the electric discharge which is produced when the magnitude of the electromagnetic waves transmitted through a wave guide attains or exceeds a predetermined value. The resonant aperture or slot 50 comprises an elongated portion or slit 51 terminated at each end in enlarged openings 52 and 53. One of the openings, such as opening 53, may be provided with an extension 54 in which is placed an adjustable or deformable diaphragm 55 which is sealed to the body of the wall so that the region including the aperture may be maintained at low pressure or within a desired atmosphere. A metallic member or block 56 of high thermal conductivity is attached to diaphragm 55 and may be actuated or positioned by a differential screw arrangement 57 similar to that shown in Fig. 9. In like manner, the adjusting means is made externally accessible by extending to a recess 58 in the body of the metallic wall.

The wave guide structures shown in Figs. 7–10 are more specifically described and claimed in my copending application, Serial No. 568,512, filed December 16, 1944.

While I have shown and described my invention as applied to a particular system embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a dielectric wave guide of the hollow-pipe type, exciting means for establishing electromagnetic waves within said guide, a metallic wall associated with said guide and lying in a plane substantially transverse to the direction of wave propagation through said guide and provided with an aperture having an appreciable dimension perpendicular to the electric component of the field incident to the propagation of waves through said guide and tuned to the frequency of said exciting means, and a substantially reflectionless structure connected across said aperture comprising a dielectric material sealed to said wall and having an impedance effect substantially equal and opposite to that produced by said aperture.

2. In combination, a dielectric wave guide of the hollow-pipe type, exciting means for establishing electromagnetic waves within said guide, a metallic wall associated with said guide and lying in a plane substantially transverse to the direction of wave propagation through said guide and provided with an aperture having an appreciable dimension perpendicular to the electric component of the field incident to the propagation of waves through said guide and tuned to the frequency of said exciting means, and means connected across said aperture comprising a vitreous dielectric member sealed to said wall and having an effective impedance substantially equal and opposite to that of said aperture so that the assembly including said dielectric member and said wall is substantially reflectionless.

3. In combination, a hollow-pipe type conductive member, exciting means for establishing electromagnetic waves within said member, a wall positioned in said member lying in a plane substantially transverse to the direction of wave propagation through said member and provided with an aperture having an appreciable dimension perpendicular to the electric component of the waves and tuned to the frequency of the exciting means, and a substantially reflectionless enclosure for said aperture comprising a bulbous dielectric member sealed to said wall.

4. In combination, a dielectric wave guide of the hollow-pipe type, excitation means for establishing electromagnetic waves within said guide, a metallic wall associated with said guide and lying in a plane substantially transverse to the direction of wave propagation through said guide and provided with an aperture having an appreciable dimension transverse to the electric component of the field due to said waves and tuned to the frequency of said exciting means, a bulbous vitreous member sealed to one side of said wall and proportioned to neutralize substantially the reflection incident to said aperture so that the assembly including said wall and said bulbous member is substantially reflectionless.

5. In combination, a dielectric wave guide of the hollow-pipe type, means for establishing electromagnetic waves within said guide, a conductive wall associated with said guide and provided with an aperture having an appreciable dimension substantially perpendicular to the electric component of the field incident to the propagation of waves through said guide, and means for sealing a region of said guide determined in part by said wall and comprising a bulbous vitreous member supported by said wall and sealed across said aperture, said bulbous member being proportioned relative to said aperture so that the assembly including said wall and said bulbous member is substantially reflectionless.

6. In combination, a dielectric wave guide of the type comprising a conductive hollow-pipe member, means for establishing electromagnetic waves within said guide, a metallic wall associated with said guide and lying in a plane substantially transverse to the direction of wave propagation therethrough and provided with an aperture having an appreciable dimension substantially transverse to the electric component of the field incident to the propagation of waves through said guide, said wall being provided with a cylindrical flange, and a bulbous dielectric member sealed to said flange and being proportioned to have an effective impedance substantially equal and opposite in effect to the impedance of said aperture so that the assembly including said bulbous member and said wall is substantially reflectionless.

7. In combination, a dielectric wave guide of the type comprising a conductive hollow-pipe member, means for establishing electromagnetic waves within said guide, a metallic wall associated with said guide and lying in a plane substantially transverse to the direction of wave propagation therethrough and provided with an aperture having an appreciable dimension substantially transverse to the electric component of the field incident to the propagation of waves through said guide, said wall being provided with a cylindrical flange, and a bulbous vitreous member sealed to said flange and proportioned to neutralize substantially the discontinuity in impedance incident to said wall.

8. In combination, a dielectric wave guide comprising a hollow-pipe type member, means for establishing electromagnetic waves within said member, a wall positioned in said member and lying in a plane substantially transverse to the direction of wave propagation through said member and provided with an aperture having an appreciable dimension substantially perpendicular to the electric component of the field incident to said waves and tuned to the frequency of said exciting means, and means for sealing said aperture comprising a bulbous type member supported by said wall and comprising a vitreous dielectric material spaced from the immediate vicinity of said aperture so that variations in the position of said bulbous member incident to pressure changes, strains and the like do not appreciably affect the reflection characteristics of the assembly including said wall and said bulbous member.

9. In combination, a hollow-pipe type dielectric wave guide, means for establishing electromagnetic waves within said guide, a metallic wall associated with said guide lying in a plane substantially transverse to the direction of wave propagation therethrough and provided with an aperture having an appreciable dimension perpendicular to the electric component of said waves and tuned to the frequency of the exciting means, and an enclosure for said aperture comprising a bulbous vitreous member and a metallic ring sealed to said bulbous member and said wall and having a temperature coefficient of expansion substantially equal to the temperature coefficient of expansion of said bulbous member.

10. In combination, a hollow-pipe type dielectric wave guide, means for establishing electromagnetic waves within said guide, a metallic wall associated with said guide lying in a plane substantially transverse to the direction of wave propagation therethrough and provided with an aperture having an appreciable dimension perpendicular to the electric component of said waves and tuned to the frequency of the exciting means, and an enclosure for said aperture and mounted on at least one side of said wall comprising a vitreous hemispherical member and a metallic ring sealed to said bulbous member and said wall.

11. In combination, a dielectric wave guide of the hollow-pipe type, exciting means for establishing electromagnetic waves within said guide, a metallic wall associated with said guide and lying in a plane substantially transverse to the direction of wave propagation therethrough and provided with an aperture having an appreciable dimension perpendicular to the electric component of the waves and tuned to the frequency of the exciting means, said wall being provided with a circular groove, and an enclosure for said aperture mounted on one side of said wall and comprising a bulbous vitreous member and an annular ring positioned in said groove and sealed to said wall and said bulbous member.

12. In combination, a dielectric wave guide of the hollow-pipe type, exciting means for establishing electromagnetic waves within said guide, a metallic wall associated with said guide and lying in a plane substantially transverse to the direction of wave propagation through said guide and provided with an aperture having an appreciable dimension perpendicular to the electric component of the field incident to the propagation of waves through said guide and tuned to the frequency of said exciting means, a dielectric window in spaced relation with respect to said aperture, a spacer substantially surrounding said aperture and connecting said window and said wall in spaced relation and for affording an appreciable space between said window and said wall whereby said window may be sealed to said wall.

13. In combination, a dielectric wave guide of the hollow-pipe type, exciting means for establishing electromagnetic waves within said guide, a metallic wall associated with said guide and lying in a plane substantially transverse to the direction of wave propagation through said guide and provided with an aperture having an appreciable dimension perpendicular to the electric component of the field incident to the propagation of waves through said guide and tuned to the frequency of said exciting means, a vitreous dielectric window in spaced relation with said wall, a spacer substantially surrounding said aperture for maintaining said window and wall in spaced relation and for providing a space for a vacuum cement to seal said window to said wall.

14. In combination, a dielectric wave guide of the hollow-pipe type comprising two metallic sections, exciting means for establishing electromagnetic waves within said guide, a metallic wall conductively connected to one of said sections and lying in a plane substantially transverse to the direction of wave propagation through said guide and provided with an aperture having an appreciable dimension perpendicular to the electric component of the field incident to the propagation of waves through said guide and tuned to the frequency of said exciting means, a dielectric window in spaced relation with said wall, a spacer substantially surrounding said aperture and in contact with said window and said wall for maintaining said window and said wall in spaced relation and for providing a space for a vacuum cement for sealing one of said sections with respect to the other, and means for conductively connecting said sections and bridging said window.

MILAN D. FISKE.